3,152,996
PREPARATION OF CARBON BLACK SLURRIES
Robert A. Forrester, Baytown, Tex., assignor, by mesne assignments, to Ashland Oil & Refining Company, Ashland, Ky., a corporation of Kentucky
No Drawing. Filed July 13, 1960, Ser. No. 42,471
3 Claims. (Cl. 252—313)

This invention relates to synthetic rubber latices. More particularly, it relates to the preparation of carbon black-synthetic rubber latex masterbatches. Still more particularly, it relates to an improved process for preparing an aqueous carbon black slurry useful in the preparation of such latex masterbatches.

Because carbon black is hydrophobic, the incorporation thereof in water constitutes a problem. The finer the black, moreover, the more difficult the problem. It is possible to form dilute slurries, i.e., about 5% solids, by directly mixing black in water, but as the solids content increases, the slurry rapidly thickens to an unmanageable paste. To permit the formation of more manageable, higher solids content slurries, i.e., on the order of 15–20%, the use of dispersing agents, particularly certain sulfonic acid derivatives, has been generally practiced. Excellent foam-free dispersions are readily obtained with various commercially available dispersing agents of this type, such as Tamol N (a sodium salt of condensed sulfonic acid), Daxad 11 (polymerized sodium salts of alkyl naphthalene sulfonic acids), Marasperse CB (a partially desulfonated sodium lignosulfonate), and the like. Nevertheless, the use of this type of dispersing agent has not been without certain disadvantages since it is generally believed that such use has an adverse effect on the compounding characteristics of the rubber.

It has also been proposed to prepare carbon black slurries using various surfactants, such as fatty acid soaps and/or disproportionated rosin acid soaps. Tires manufactured from masterbatches prepared with such black slurries have demonstrated an improved road-wear resistance of as much as 5% over those made from masterbatches prepared with black slurries containing the above described sulfonate type dispersing agents. This is probably due to the fact that the surfactant used in preparation of the black slurry is the same or similar to that employed in the emulsion polymerization system. Nevertheless, the use of surfactants has also not been without attendant disadvantages since excessive surface foaming as well as submerged foaming occurs. This renders their use in normal plant equipment impractical.

There has continued to remain, therefore, a demand for an improved process which is capable of providing a uniform dispersion of carbon black in water but which, at the same time, is not subject to the above described disadvantages. It is a principal object of this invention to provide such a process. It is a further object of this invention to provide a process for preparing an aqueous slurry of carbon black which does not employ dispersing agents or surfactants as above described. An additional object of this invention is to provide a process which is simple, economical and readily practiced in standard plant equipment with a minimum of supervision.

Surprisingly, these objects have been met in a simple yet unusually effective manner. In general, the process of this invention comprises adding carbon black with moderate agitation to an aqueous solution of a water-soluble hydroxide selected from the group consisting of the alkali metal and ammonium hydroxides. The result is a uniform dispersion of carbon black in water adapted for use in the preparation of black-latex masterbatch processable in a conventional manner to a black-rubber masterbatch.

The results obtained by the process of this invention are particularly unexpected inasmuch as it is known in the preparation of black slurries using a sulfonic acid type dispersing agent to incorporate a small amount, i.e., about 0.5% on the weight of the black, of sodium hydroxide in the solution of dispersing agent. This is considered to be advantageous inasmuch as it is alleged to influence the fluidity of the slurry and the completeness of dispersion. According to this invention, however, it has been found that as little as 0.1% on the weight of black of a water-soluble hydroxide when used alone has a profound effect on the suspension of carbon black in water. It has been further found, however, that when attempting to prepare slurries having a density of greater than about 12%, that the presence of a water-soluble hydroxide even in amounts substantially greater than 0.5% is not effective in providing a manageable viscosity. For the purposes of this invention, therefore, it is essential that the solids content of the final slurry be less than about 12%. Within this range of slurry concentrations, the concentration of water-soluble hydroxide may be considerably increased beyond 0.1%, although little added advantage is gained by employing much beyond about 0.5%. It is a preferred mode of operation in accordance with this invention to employ about 0.2–0.3% of a water-soluble hydroxide in the preparation of a 10–12% carbon black slurry.

Black masterbatches prepared from the aqueous carbon black slurries of this invention do not exhibit the undesirable characteristics of black masterbatches prepared with dispersing agent-black slurries, which characteristics are generally attributed, directly or indirectly, to the dispersing agent. Moreover, the black masterbatches of this invention exhibit certain advantages over the dispersing agent-black masterbatches. In addition, slurries prepared according to the instant invention do not exhibit the foaming characteristics of a slurry prepared with a fatty acid soap and/or disproportionated rosin and soap.

The process of this invention is particularly directed to forming aqueous slurries of carbon black employing those carbon blacks generally referred to as highly reinforcing blacks, such as HAF, a furnace carbon black capable of imparting high abrasion resistance to rubber. While the primary purpose for preparing the aqueous slurries according to the process of this invention is for incorporation into styrene-butadiene latices, aqueous slurries thus prepared may just as readily be employed in the preparation of other synthetic latices.

The process of this invention will be further described by the following examples which are intended to be illustrative only and not by way of limitation. Unless otherwise noted, all parts are by weight.

*Example 1*

In a continuous process, micropulverized HAF carbon black is introduced into an aqueous sodium hydroxide solution. The rates of carbon black and water introduction are such as to provide a carbon black-water system having a carbon black solids content of approximately 11.1% by weight and a 0.25% sodium hydroxide content based on the carbon black. During the preparation of the slurry, the viscosity increases from approximately 80 centipoises to approximately 400 centipoises. A uniform dispersion is obtained in a slurry of readily manageable viscosity.

To demonstrate the necessity for both water-soluble hydroxide concentration and slurry density control, the following example is conducted.

Example 2

The procedure of Example 1 is repeated except the addition rates are such as to maintain a sodium hydroxide concentration approximately 0.6% on the weight of the carbon black and a carbon black solids content of about 12% by weight. Under these conditions, the viscosity increases from about 70 centipoises to approximately 700 centipoises. The resultant slurry is unmanageable in conventional plant equipment.

Example 3

The procedure of Example 1 is repeated replacing sodium hydroxide with equivalent weights of ammonium hydroxide and potassium hydroxide. Similar results are obtained in each instance as in Example 1.

I claim:

1. In a process of preparing carbon black slurry, the improvement which comprises: agitating highly reinforcing carbon black in water containing a water soluble hydroxide selected from the group consisting of alkali metal and ammonium hydroxides, but which is free of organic dispersing agents, the hydroxide content being less than about 0.5% by weight of the carbon black and the carbon black content being less than about 12% by weight of the water, whereby an aqueous carbon black slurry is obtained as a fluid, stable and uniform dispersion.

2. A process according to claim 1 in which the hydroxide is an alkali metal hydroxide.

3. In a process of preparing carbon black slurry, the improvement which comprises: agitating a highly reinforcing carbon black in an aqueous sodium hydroxide solution free of organic dispersing agents, the sodium hydroxide content being about 0.2–0.3% by weight of the carbon black, and the carbon black content being about 10–12% by weight of the water, whereby an aqueous carbon black slurry is obtained as a fluid, stable and uniform dispersion.

References Cited in the file of this patent

UNITED STATES PATENTS

| | | |
|---|---|---|
| 2,178,383 | Wiegand | Oct. 31, 1939 |
| 2,441,523 | Ward | May 11, 1948 |
| 2,794,749 | Schulze | June 4, 1957 |